United States Patent Office 2,874,195
Patented Feb. 17, 1959

2,874,195

CHLORONITRATION OF ALKENES

Gustave B. Bachman, West Lafayette, Ind., and John Paul Chupp, Nitro, W. Va., assignors to Purdue Research Foundation, Lafayette, Ind., a corporation of Indiana No Drawing. Application March 29, 1956
Serial No. 574,598

4 Claims. (Cl. 260—644)

Our invention relates to the production of chloronitroparaffins and more particularly it relates to the vapor phase chloronitration of alkenes to obtain chloronitroalkanes.

Chloronitroalkanes have previously been obtained by the method set forth in U. S. Patent 2,337,912 whereby the corresponding nitroalkane is chlorinated within or without the presence of a dehydrating agent, either in the vapor or liquid phase to obtain the chloronitroalkane.

We have now discovered a new process for the production of chloronitroalkanes whereby we can employ a readily available hydrocarbon which has not previously been found useful in the production of chloronitroalkanes.

Our new process involves chloronitration of alkenes to produce the corresponding chloronitroalkane. The alkenes which we employ are those alkenes containing up to about 20 carbon atoms. Our reaction is carried out in the vapor phase and the gaseous reaction product is subsequently condensed. The condensate is then steam distilled, and the steam distillate fractionally distilled to separate the product into three main fractions i. e. the low boiling alkenyl chloride and chloroalkanes, an intermediate unstable fraction containing high amounts of oxygen and chlorine and containing only very small amounts of nitrogen and the high boiling, practically colorless fraction of chloronitroalkane.

In carrying out our new process for the chloronitration of alkenes, we can employ temperatures ranging from about 200° C. to about 400° C. The chloronitration is effected with chlorine and nitrogen dioxide and for each mole of nitrogen dioxide employed, we can employ from about 6 to about 35 moles of alkene and from about 0.4 to about 1.5 moles of chlorine. Preferably we employ about 7.5 moles of alkene and about 1 mole of chlorine for each mole of nitrogen dioxide employed. Generally, we prefer to employ a temperature of about 275° C. in carrying out our reaction.

We have found that the optimum contact time varies inversely with the temperature employed. As the temperature is raised from 200 toward 400° C., the optimum time of contact decreases from a time of about 10 seconds to a time of about 1 second. However, at the optimum temperature of about 275° C., the preferred contact time is about 3.5 to 4.0 seconds.

In carrying out our reaction, we can combine the reactants in a number of different ways. For example, we can mix the nitrogen dioxide and the chlorine and add the mixture to the hydrocarbon after which the combined reactants are preheated prior to entry into the reaction zone. On the other hand, we can mix the nitrogen dioxide with the hydrocarbon and then add the chlorine to this mixture before heating to reaction temperature. Other procedures will be apparent to those skilled in the art.

A better understanding of the nature of our invention can be had by reference to the following examples which are presented for purposes of illustration only and are in no way intended to limit the invention.

Example I

A reaction mixture consisting of 7.5 moles of propene, 1 mole of nitrogen dioxide and 1 mole of chlorine was passed in the vapor phase through a reactor which consisted of three 90 cm. lengths of Pyrex glass tubing (22 mm. diameter), each of which were bent into the form of a U, the three tubes being connected in series. The reaction mixture was passed through the reactor at a temperature of 275° C. and a contact time of 4 seconds. The reaction products were condensed, steam distilled and the steam distillate was then fractionally distilled under reduced pressure to remove a low-boiling fraction, an intermediate unstable fraction, and the high-boiling, practically colorless 1-chloro-2-nitropropane. The high-boiling 1-chloro-2-nitropropane fraction distilled at 90–91° at a pressure of 40 mm. mercury.

Example II

A mixture of 1-butene, nitrogen dioxide, and chlorine in a mole ratio of 7.5/1/1 was introduced to the reactor described in Example I. The reaction was conducted at a temperature of 275° C. and a contact time of 3.5 seconds. The product was steam distilled, and then fractionally distilled to obtain a fraction boiling at 94° C. at 34 mm. mercury pressure which high-boiling fraction consisted of 1-chloro-2-nitrobutane.

Example III

The compound isobutene was subjected to chloro-nitration in the manner described in the above examples. The product obtained was 1-chloro-2-nitro-2-methlylpropane.

Now having described our invention, what we claim is:

1. A process for the production of 1-chloro-2-nitrobutane which comprises reacting about 7.5 moles of 1-butene with about 1 mole of chlorine and about 1 mole of nitrogen dioxide in the vapor phase at a temperature of about 275° C. and recovering the 1-chloro-2-nitrobutane so produced.

2. A process for the production of 1-chloro-2-nitropropane which comprises reacting about 7.5 moles of propene, about 1 mole of chlorine and about 1 mole of nitrogen dioxide in the vapor phase at a temperature of about 275° C. and recovering the 1-chloro-2-nitropropane so produced.

3. A process for the production of 1-chloro-2-nitroalkanes which comprises reacting from about 6 to about 30 moles of an alkene having not more than 20 carbon atoms from about 0.4 to about 1.5 moles of chlorine and about 1 mole of nitrogen dioxide in the vapor phase at a temperature ranging from about 200 to about 400° C., and recovering the corresponding chloronitroalkane so produced.

4. A process for the production of 1-chloro-2-nitroalkanes which comprises reacting an alkene having not more than 20 carbon atoms with chlorine and nitrogen dioxide in the vapor phase at a temperature ranging from about 200 to about 400° C. and recovering the chloronitroalkane so produced.

References Cited in the file of this patent
UNITED STATES PATENTS 2,511,915  Himel _____ June 20, 1950